(12) United States Patent
Thirunakara

(10) Patent No.: US 12,625,609 B1
(45) Date of Patent: May 12, 2026

(54) INPUT DEVICE FOR INTERFACING WITH AN ELECTRONIC DEVICE

(71) Applicant: Outshiny India Pvt Ltd, Bangalore (IN)

(72) Inventor: Sridhar Thirunakara, Bengaluru (IN)

(73) Assignee: Outshiny India Pvt Ltd (IN)

( * ) Notice: Subject to any disclaimer, the term of this patent is extended or adjusted under 35 U.S.C. 154(b) by 0 days.

(21) Appl. No.: 19/089,639

(22) Filed: Mar. 25, 2025

(51) Int. Cl.
*G06F 3/04886* (2022.01)
*G06F 3/044* (2006.01)

(52) U.S. Cl.
CPC .......... *G06F 3/04886* (2013.01); *G06F 3/044* (2013.01)

(58) Field of Classification Search
CPC ................. G09G 3/32; G09G 2310/08; G09G 2320/0276; G09G 2320/068; G09G 2330/021; G09G 2380/10
USPC ........................................................ 345/55
See application file for complete search history.

(56) References Cited

U.S. PATENT DOCUMENTS

| 2009/0231493 A1* | 9/2009 | Baalbergen | ........... | G06F 3/0488 |
| | | | | 345/173 |
| 2010/0066677 A1* | 3/2010 | Garrett | ................... | G06F 1/169 |
| | | | | 345/173 |
| 2021/0342020 A1* | 11/2021 | Jorasch | ................... | G06F 3/038 |

FOREIGN PATENT DOCUMENTS

KR          20180086393 A * 7/2018 ........... G06F 3/0485

* cited by examiner

*Primary Examiner* — Nathan P Brittingham
(74) *Attorney, Agent, or Firm* — Vani Moodley, Esq.

(57) ABSTRACT

The present invention relates to an input device (100) for interfacing with an electronic device (200). The input device (100) includes a housing (10), a touch display (40), at least one sensor (50), and a processing unit (60). The touch display (40) is arranged on a portion of the housing (10), configured to display a keyboard and receive touch input from the user. The sensor (50) is adapted to detect the position of one or more fingers of the user relative to the touch display (40) for showing the position of the fingers on a screen (210) of the electronic device (200). Specifically, the processing unit (60) is configured to determine the position of the finger aligning with a key displayed on the touch display (40), and upon detecting the touch input corresponding to the position of the key, transmits an input signal to the electronic device (200).

17 Claims, 8 Drawing Sheets

INPUT DEVICE FOR INTERFACING WITH AN ELECTRONIC DEVICE

TECHNICAL FIELD

The present invention relates to an input device. More specifically, the present invention relates to an input device for interfacing with an electronic device.

BACKGROUND

Presently, input devices are essential components for interfacing with computer systems, enabling users to provide commands, navigate interfaces, and input data. The traditional input devices, such as keyboards and mice, operate as different input devices, with keyboards used for text entry and mice used for cursor control. To control these two functions two separate devices are required which limits the adaptability of input systems, particularly in a situation where compact and multifunctional solutions are required.

The keyboard is effective for typing but is fixed in layout and size, making it less suitable for portable or space-constrained environments. Further, a separate interface is required for cursor control, such as a mouse or a touchpad, which adds to the bulk and complexity of the computer system. Furthermore, physical keyboards are limited in their ability to adapt to user-specific requirements, such as dynamic layouts or specialized input methods.

Similarly, the traditional mouse is designed for pointer control and relies on fixed buttons and scroll wheels for input. The mouse offers precise movement detection, but it lacks the ability to provide multi-functional input or adapt to modern user interfaces that demand seamless transitions between typing and pointer-based interactions. Currently, users rely on multiple separate devices such as keyboards, mice, and additional input devices which creates inefficiencies in workflows and is challenging for users working in compact or mobile setups.

The existing technologies in input devices, do not adequately meet the demand for a compact, multifunctional, and adaptable input device that enhances user interaction without sacrificing comfort or precision.

Therefore, there is a need for an input device for interfacing with an electronic device to overcome a few or all drawbacks of the existing technologies.

STATEMENT OF THE INVENTION

An object of the present invention is to provide an input device for interfacing with an electronic device.

Another object of the present invention is to provide an input device for interfacing with an electronic device that enables seamless and versatile interaction Another object of the present invention is to provide an input device for interfacing with an electronic device that improves usability and functionality.

Yet another object of the present invention is to provide an input device for interfacing with an electronic device that provides accurate and intuitive input.

Another object of the present invention is to provide an input device for interfacing with an electronic device that provides a multifunctional and compact alternative that combines typing, navigation, and advanced input capabilities in one device.

According to the present invention, there is provided an input device (100) for interfacing with an electronic device. The input device may include a housing, a motion sensor, a plurality of buttons, at least one sensor, a touch display and a processing unit. The housing may be adapted to be held by a user. The housing may have a top surface and a bottom surface, the bottom surface is adapted to slide over a fixed surface The motion sensor may be adapted to detect the movement of the input device relative to a fixed surface.

The plurality of buttons may be arranged on the housing and adapted to transmit user input to the electronic device. The plurality of buttons includes a first button, a second button, and a scroll wheel arranged between the first button and the second button. The plurality of buttons may be arranged at a front portion of the top surface of the housing. The first button may be arranged in a left region of the front portion, the second button may be arranged in a right region of the front portion, and the scroll wheel may be arranged between the first button and the second button. The scroll wheel may be rotatably arranged to transmit user input to the electronic device.

The touch display may be arranged on a portion of the housing and may be configured to display a keyboard and receive touch input from the user. The touch display may be arranged on an upper surface of the housing adjacent to the plurality of buttons, allowing the fingers of the user to reach the touch display. The touch display may be arranged adjacent to the plurality of buttons at a rear portion of the top surface of the housing.

Further, at least one sensor may be arranged on the housing and may be adapted to detect a position of one or more fingers of the user relative to the touch display for showing the position of the fingers on a screen of the electronic device. In the present aspect, the sensor includes a first sensor and a second sensor arranged adjacent to each other to detect at least one finger of the user.

Specifically, in the present aspect, the top surface includes a slanted portion configured between the front portion and the rear portion to arrange at least one sensor thereon in such a way that the fingers of the user hovering over the touch display are detected to communicate with a processing unit of the input device. The slanted portion separates the front portion and the rear portion, the slanted portion extends from the front portion in a downward direction and blends with the rear portion of the top surface.

The processing unit may be configured to determine the position of the finger aligning with a key displayed on the touch display, and upon detecting the touch input corresponding to the position of the key, the processing unit may transmit an input signal of the selected key to the electronic device. The processing unit may be adapted to transmit the input signal to the electronic device through a wire connection or a wireless connection.

The electronic device may include a virtual keyboard displayed on the screen of the electronic device to allow the user to track the finger for aligning above one or more keys of the keyboard. The virtual keyboard may be configured to receive the input signal from the touch display upon detecting the touch input from the user.

In an aspect, the input device is connected to the electronic device through a wired connection or a wireless connection.

Further, the plurality of buttons, the sensor, the touch display and the processing unit may be connected to a power source to power the input device. In one of the aspects, the power source may be a battery arranged in the housing and adapted to charge using a charging port arranged on the housing.

In another aspect, the input device may include a switch arranged on the bottom surface of the housing to turn ON or OFF the input device.

In one more aspect, the input device may include a first shortcut button and a second shortcut button arranged on the front portion, which is adapted to be customised according to the user. The first shortcut button and the second shortcut button may be configurable to perform preset tasks assigned by the user.

In one more aspect, the input device may include a microphone arranged on the side surface of the housing to receive voice input from the user. The processing unit may process the voice input and generate the corresponding user input to communicate with the electronic device.

BRIEF DESCRIPTION OF DRAWINGS

Other features and advantages of the invention will become apparent when reading the detailed description given below, purely by way of example and in a non-limitative manner, referring to the following figures:

FIG. 7 shows a bottom view of an input device for interfacing with an electronic device in accordance with one of the embodiments of the present invention;

FIG. 8a shows a perspective view of an input device for interfacing with an electronic device in accordance with one of the embodiments of the present invention;

FIG. 8b shows a back view of an input device for interfacing with an electronic device in accordance with the embodiments shown in FIG. 8a;

DETAILED DESCRIPTION

An embodiment of this invention, illustrating its features, will now be described in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The disclosed embodiments are merely exemplary of the invention, which may be embodied in various forms.

Figure 1:
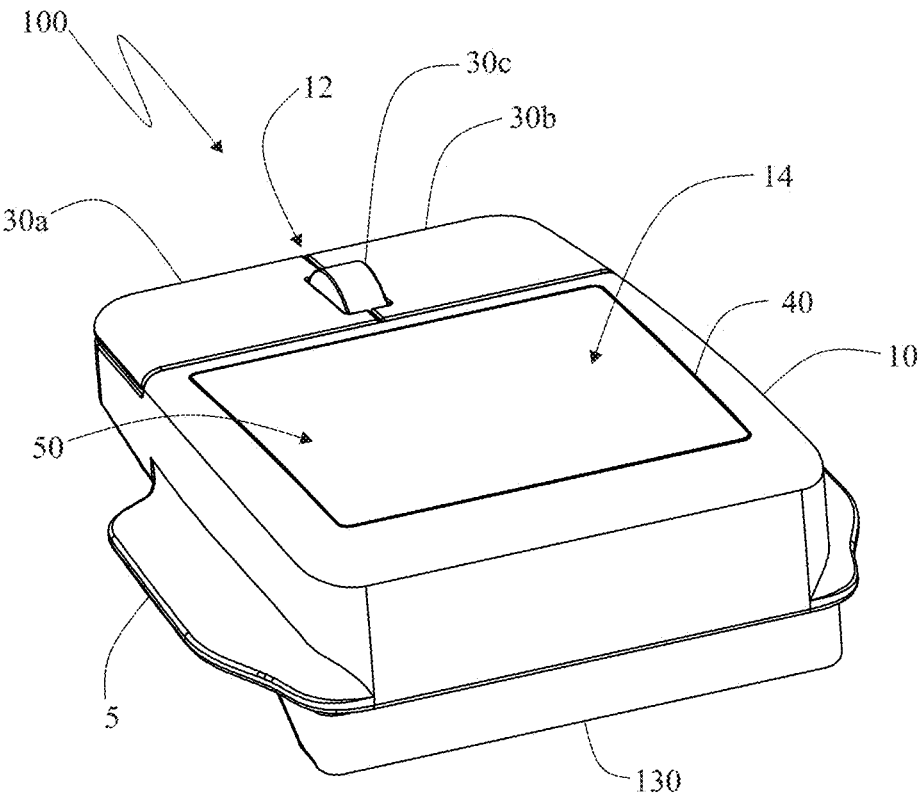
FIG. 1 shows a perspective view of an input device for interfacing with an electronic device in accordance with the present invention.
Figure 2:
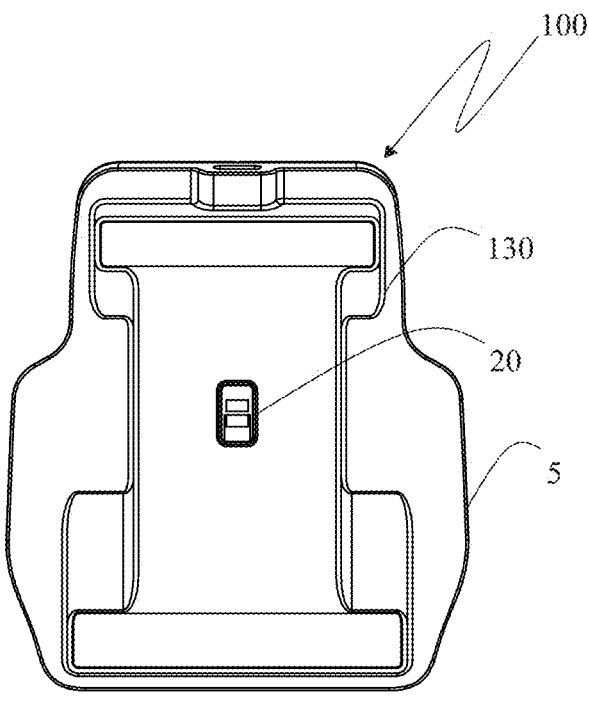
FIG. 2 shows a bottom view of an input device for interfacing with an electronic device in accordance with the present invention.

Referring now to FIGS. 1 and 2, an input device (100) for interfacing with an electronic device (200) in accordance with the present invention is illustrated. The input device (100) includes a housing (10), a motion sensor (20), a plurality of buttons (30a, 30b, 30c), at least one sensor (50), a touch display (40) and a processing unit (60). Further, the input device (100) includes a power source (not shown) to power the input device (100). In one embodiment, the power source is a battery arranged within the housing (10) to power the motion sensor (20), the plurality of buttons (30a, 30b, 30c), the sensor (50), the touch display (40), and the processing unit (60).

The input device (100) is configured to communicate with the electronic device (200) to transmit user input from a user. The input device (100) is adapted to be held by the user, specifically, the housing (10) has a shape and size adapted according to the user's hand allowing the user to hold and interact with the input device (100) to send user input to the electronic device (200).

In the present embodiment, the housing (10) has a rectangular shape, especially a cuboidal shape having a top surface, a bottom surface, and side surfaces. The input device (100) includes a hand support (5) to rest the fingers or hand of the user thereon. The hand support (5) is a portion extending from the housing in a horizontal plane providing a surface to receive the fingers of the hand of the user. In the present embodiment, the input device (100) includes two hand supports.

The bottom surface is facing to a fixed surface. Specifically, the bottom surface is a flat surface that is adapted to be placed and slid over the fixed surface. In an embodiment, the input device (100) includes a sliding portion (130) provided on the bottom surface. The sliding portion (130) is provided on the entire bottom surface or may be on portions of the bottom surface. The sliding portion (130) is in contact with the fixed surface and is provided to allow smooth movement of the input device (100) on the fixed surface.

The fixed surface can be any surface that allows the sliding of the input device (100). The fixed surface may include a tabletop, a mouse pad, glass or transparent surfaces, fabric or soft surfaces, paper or cardboard, metal surfaces, plastic surfaces, stone or marble surfaces, rough or textured surfaces, built-in mouse mats, and the like.

The fixed surface allows the motion sensor (20) of the input device (100) to detect the movement of the input device (100) relative to the fixed surface when slid by the user. The movement of the input device (100) is detected to move a cursor (211) (shown in FIG. 5) displayed on a screen (210) of the electronic device (200) according to input from the user. The motion sensor (20) is preferably arranged at the bottom surface facing towards the fixed surface. The motion sensor (20) operates by emitting a light beam (example, an LED or laser) towards the fixed surface and detecting the reflected light using an image sensor (not shown). The reflected light changes when the input device (100) is moved, which is analysed by the motion sensor (20) to detect the direction and magnitude of the movement of the input device (100). The motion sensor (20) is adapted to track movement on surfaces including but not limited to glossy, textured, or semi-reflective surfaces. In alternative embodiments, the motion sensor (20) may operate by tracking movement relative to a fixed surface using an optical sensor, gyroscopic sensor, or other motion-tracking technology.

The motion sensor (20) is adapted to transmit motion data to the electronic device (200), moving the cursor (211) according to the user's requirement. The motion data collected by the motion sensor (20) is transmitted to the electronic device (200). The electronic device (200) is adapted to process the motion data to track the movement of the input device (100) for the corresponding movement of the cursor (211) on the screen (210). The motion sensor (20) of the input device (100) enables the user to interact with on-screen (210) elements, such as icons, text fields, or menus, by positioning the cursor (211) and then sending the user input such as clicks or selections using the plurality of buttons (30a, 30b, 30c) of the input device (100). The input device (100) is adapted to communicate the motion data to the electronic device (200) through wired or wireless communication.

Further, the top surface of the housing (10) is adapted to arrange the plurality of buttons (30a, 30b, 30c), at least one sensor (50), and the touch display (40) thereon. Specifically, the top surface has a front portion (12) to arrange the plurality of buttons (30a, 30b, 30c), and a rear portion (14) to arrange the touch display (40).

The front portion (12) includes the plurality of buttons (30a, 30b, 30c) to receive and transmit user input to the electronic device (200). The plurality of buttons (30a, 30b, 30c) includes a first button (30a), a second button (30b), and a scroll wheel (30c). Specifically, the first button (30a) is arranged on a left region and the second button (30b) is arranged on a right region of the front portion (12). The scroll wheel (30c) is arranged between the first button (30a) and the second button (30b) and is rotatable to transmit user input to the electronic device (200). The plurality of buttons (30a, 30b, 30c) is connected to the processing unit (60) to transmit the user input received from the plurality of buttons (30a, 30b, 30c) to the electronic device (200).

Figure 3:
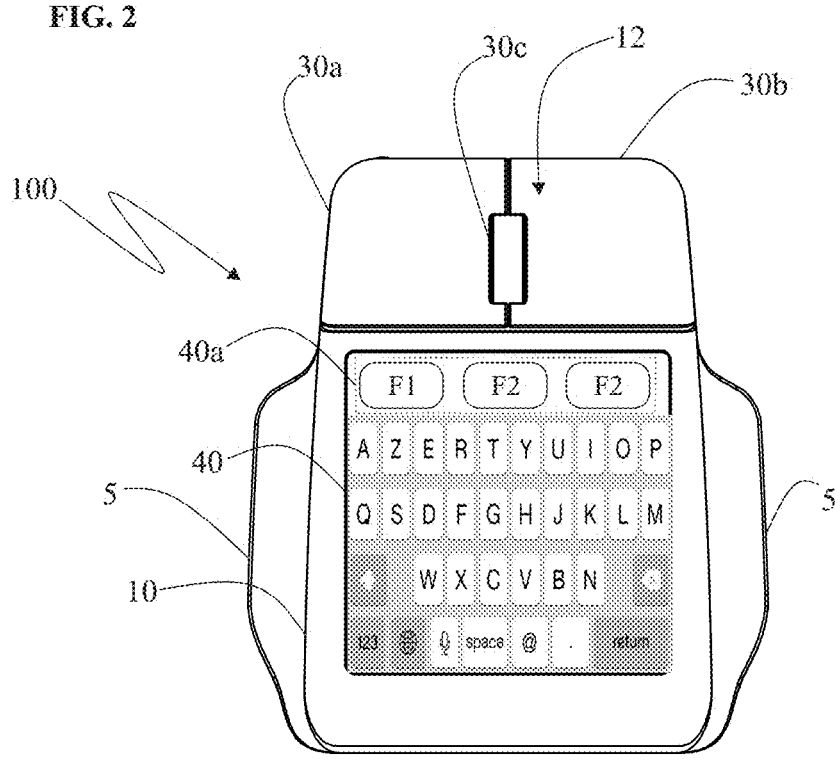
FIG. 3 shows a top view of the input device in accordance with the embodiment shown in FIG. 1.

Furthermore, the rear portion (14) includes the touch display (40) arranged adjacent to the plurality of buttons (30a, 30b, 30c) and is configured to display a keyboard (as shown in FIG. 3) and receive touch input from the user. The touch display (40) displays the keyboard along with other necessary keys and functionalities such as shortcut keys, gestures and controls, notifications and alerts, handwriting and drawing area, system diagnostics and settings and the like. Specifically, the touch display (40) is configured to provide a plurality of functional keys (40a) to allow the user to perform additional functionalities such as opening a specific app or performing a specific command. Additionally, the plurality of functional keys (40a) is configured to be used in combinations to perform additional functionalities. The touch display (40) is adapted to allow the user to assign the functionalities to each functional key or a combination of functional keys according to the user's requirements.

Further, the input device (100) is adapted to allow the user to swipe on the touch display (40) to control the input device (100). The touch display (40) is configured to receive swipe gestures from the finger(s) of the user to perform additional functionalities and/or control the keyboard displayed on the touch display (40).

Furthermore, the touch display (40) is adapted to turn OFF the touch input upon detecting that the user is not using the touch display (40). In one of the use cases, the rear portion (14) of the housing (10) is used to rest the palm of the user when the touch display (40) is not being used.

Figure 4:
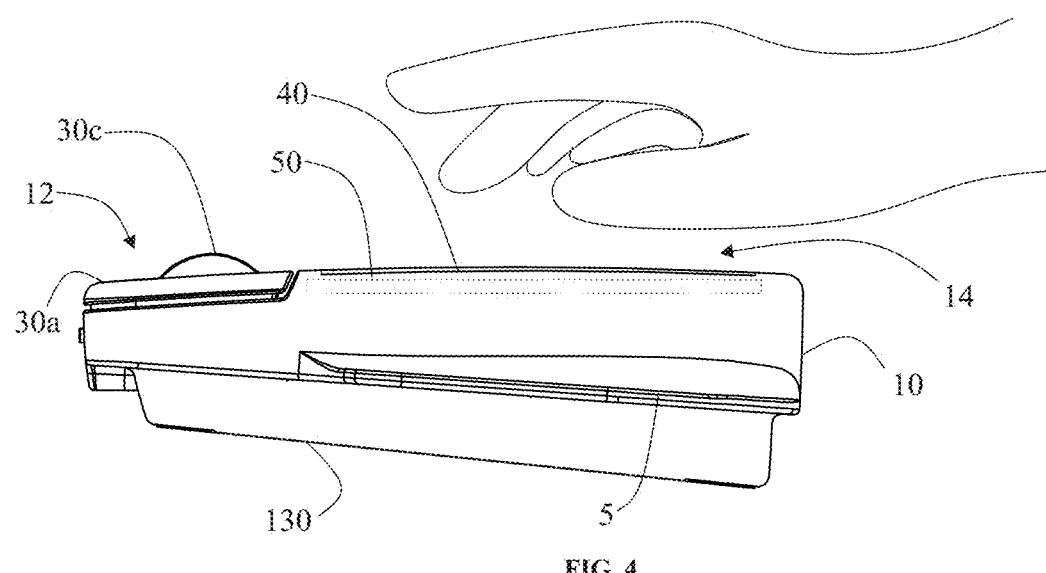
FIG. 4 shows a side view of the input device for interfacing with an electronic device in accordance with the present invention.

Referring now to FIG. 4, the sensor (50) is integrated within the touch display (40) arranged on the housing (10). In the present embodiment, the sensor (50) is a capacitive touch sensor calibrated to detect the position or movement of the fingers of the user hovering over the touch display (40). The capacitive touch sensor is integrated within or positioned adjacent to the touch display (40) to detect the fingers hovering over the touch display (40). It may be obvious for a person skilled in the art to provide any other type of sensor arranged or integrated within any other element of the input device (100) to detect the position of the finger of the user hovering over the touch display (40).

The sensor (50) is configured to detect the movement of the fingers hovering over the touch display (40) to determine the position of the finger aligning with a key displayed on the touch display (40). The sensor (50) is arranged within the housing (10) which allows monitoring of a three-dimensional space above the touch display (40). The sensor (50) is configured to capture the movement of the fingers in a lateral plane (X-Y) along with the vertical direction (Z direction perpendicular to X-Y plane) relative to the touch display (40).

The sensor (50) communicates the position of the finger with the processing unit (60) to display the position of the fingers on the screen (210) of the electronic device (200). The processing unit (60) processes the position of the fingers and a visual representation of the position of the finger is generated and displayed on the screen (210) in real-time.

Figure 5:
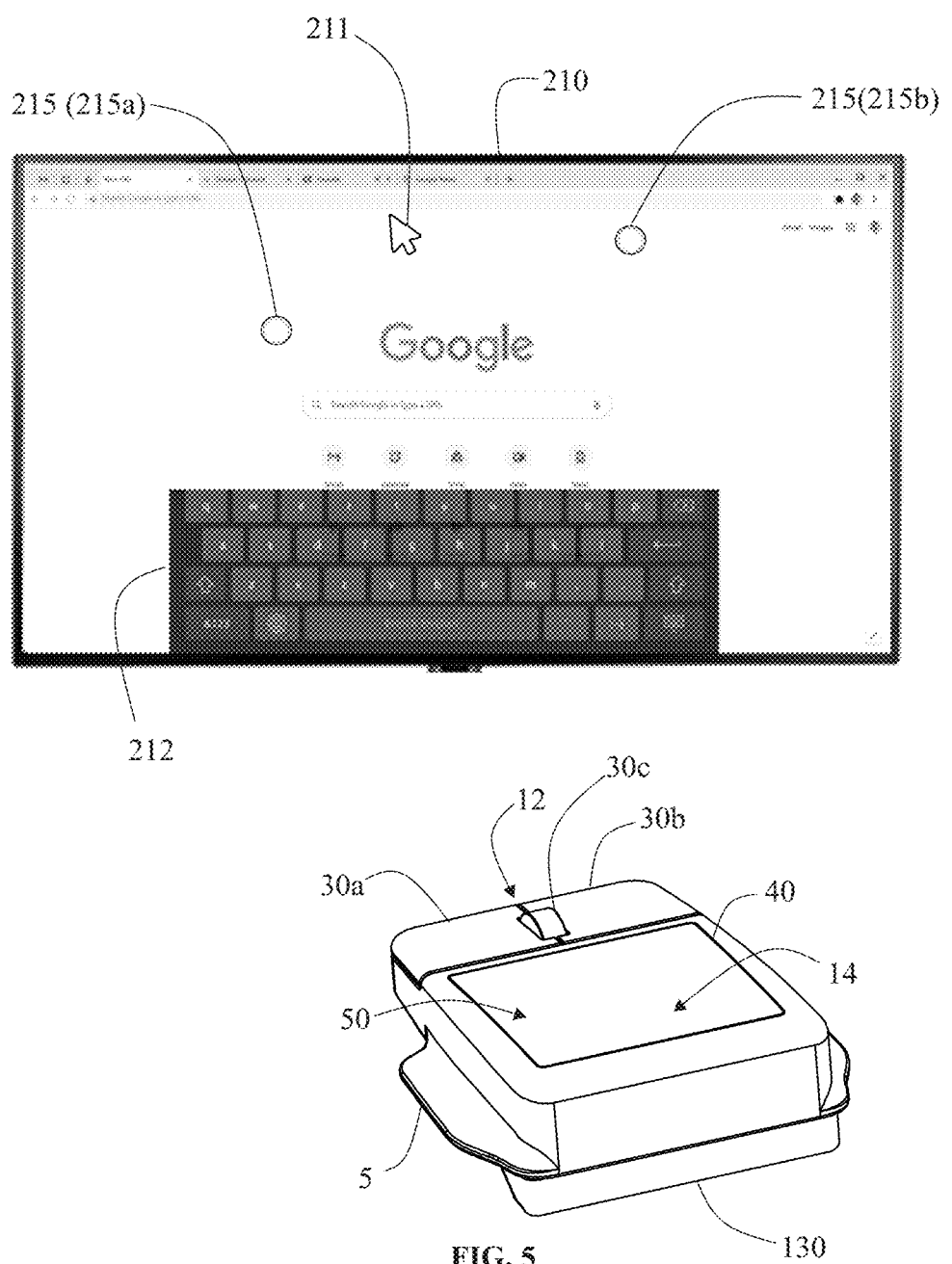
FIG. 5 shows a front view of a screen of the electronic device along with the input device to show the operation of the input device in accordance with the embodiment shown in FIG. 1.

Referring now to FIG. 5, the screen (210) of the electronic device (200) is configured to display a virtual keyboard (2111) to allow the user to track the finger for aligning above one or more keys of the keyboard, especially desired keys. The user can track the fingers on the screen (210) without looking at the touch display (40) and touch the touch display (40) when the finger is on the desired key. The virtual keyboard (2111) is configured to receive the input signal from the touch display (40) upon detecting the touch input from the user.

Specifically, the screen (210) of the computer display is adapted to show the position of the fingers through a finger indicator (215). The finger indicator (215) indicates the position of the finger relative to the touch display (40) to allow the user to position the finger on the desired key of the touch display (40). The finger indicator (215) moves on the screen (210) based on the movement of the user's fingers over the touch display (40). The finger indicator (215) allows the user to align the finger on the desired keys of the keyboard and after touching the touch display (40), the touch input of the user is transmitted to the electronic device (200) through the processing unit (60).

The finger indicator (215) is adapted to show the position of the multiple fingers of the user. In the present embodiment, the finger indicator (215) includes a first-finger indicator (215a) and a second-finger indicator (215b) corresponding to the positions of two different fingers tracked by the sensor (50). In another embodiment, the finger indicator (215) includes more than two finger indicators and is based on the number of fingers detected by the sensor (50). The electronic device (200) is adapted to display a plurality of finger indicators.

Figure 6:
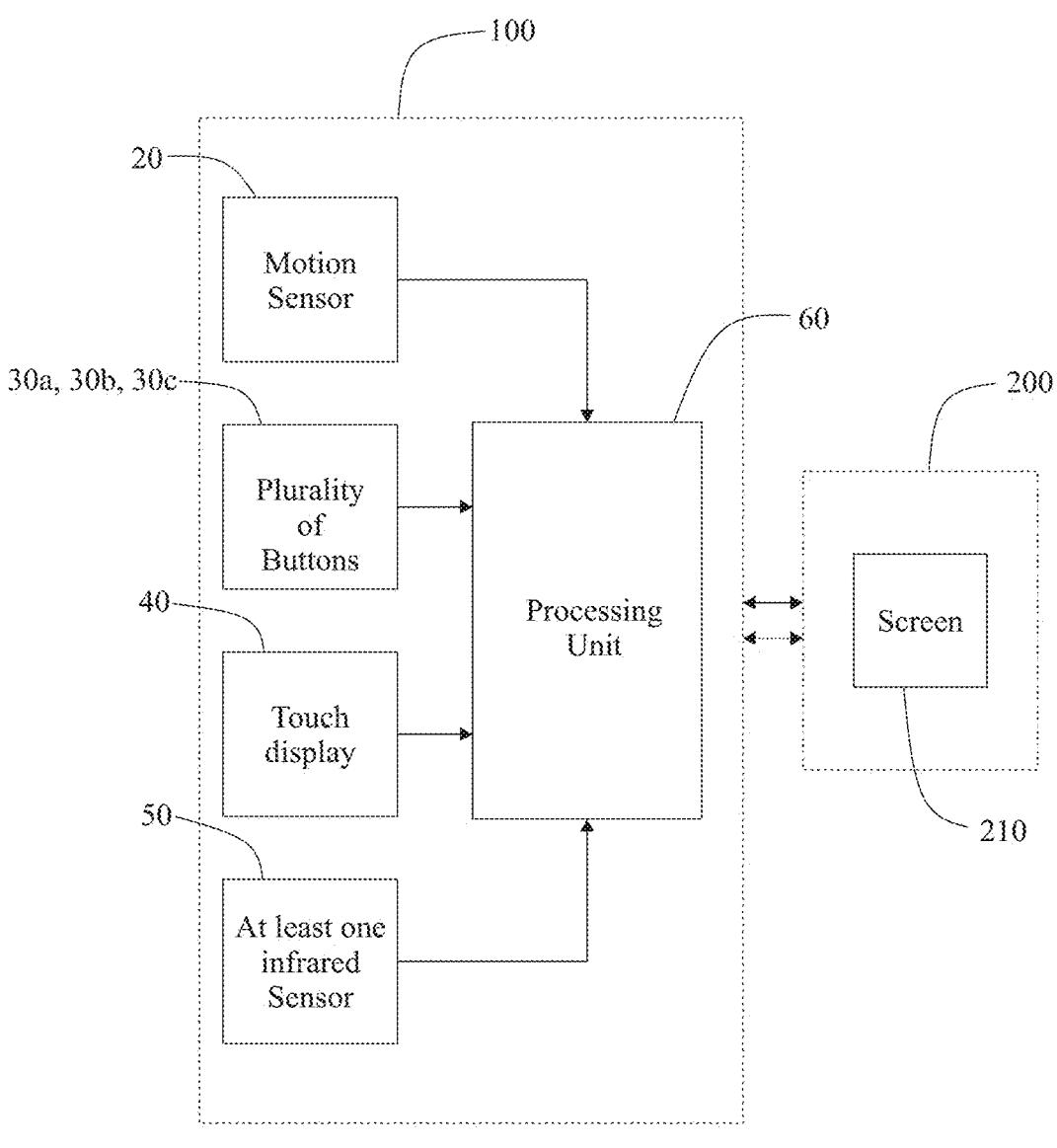
FIG. 6 shows a schematic view of the input device communicating with the electronic device.

Referring now to FIG. 6, the processing unit (60) is connected to the motion sensor (20), the plurality of buttons (30a, 30b, 30c), the touch display (40), and at least one sensor (50). The processing unit (60) is arranged within the housing (10) and adapted to communicate with the electronic device (200) through a wired connection or a wireless connection. The processing unit (60) is configured to receive user input from the motion sensor (20), the plurality of buttons (30*a*, 30*b*, 30*c*), the touch display (40), and at least one sensor (50) and transmit an input signal to the electronic device (200).

Specifically, the processing unit (60) receives motion data from the motion sensor (20), the user input from the plurality of buttons (30*a*, 30*b*, 30*c*), the touch input from the touch display (40), and the position of the fingers from the sensor (50). The processing unit (60) enables the input device (100) to integrate multiple input mechanisms to allow the user to interact with the electronic device (200). The input device (100) is operated by placing the input device (100) on the fixed surface and sliding it to control the movement of the cursor (211) displayed on the computer screen (210). Specifically, the motion sensor (20) arranged on the bottom surface records the motion data such as direction, speed, and displacement of the input device (100) relative to the fixed surface. The motion data is processed by the processing unit (60) and transmitted to the electronic device (200) to move the cursor (211) in accordance with the movement of the input device (100) as directed by the user.

Further, the plurality of buttons (30*a*, 30*b*, 30*c*) arranged on the front portion (12) of the housing (10) allows the user to perform actions such as selecting, clicking, or activating commands. Additionally, the scroll wheel (30*c*) enables the user to scroll through documents or web pages. The plurality of buttons (30*a*, 30*b*, 30*c*) is connected to the processing unit (60), which receives the user input, processes the received user input and transmits the processed input signal to the electronic device (200).

Furthermore, the rear portion (14) of the input device (100) has a touch display (40) to interact with the electronic device (200) through the touch input. The touch display (40) is configured to display a virtual keyboard (2111) along with other additional elements, such as shortcut keys, system controls, or application-specific tools. The touch display (40) allows the user to provide touch inputs by tapping or swiping on the touch display (40), which is received and processed by the processing unit (60) to generate corresponding input signals for the electronic device (200).

Moreover, to increase accuracy in touch inputs, the input device (100) uses at least one sensor (50) arranged within the housing (10) facing towards the touch display (40). The sensor (50) is configured to detect the position and movement of the user's fingers as they hover above the touch display (40). The sensor (50) detects the position of the fingers of the user in real-time and communicates with the processing unit (60). The processing unit (60) processes the position of the fingers received from the sensor (50) to generate the finger indicator (215) representing the position of the fingers on the computer screen (210). The finger indicator (215) represents the position of the user's fingers relative to the touch display (40). The finger indicator (215) allows the user to align the fingers with desired keys or interactive elements. Once the user aligns the finger and touches the desired key on the touch display (40), the touch display (40) receives the touch input which is transmitted to the processing unit (60) to communicate with the electronic device (200).

Figures 7, 8A, 8B:
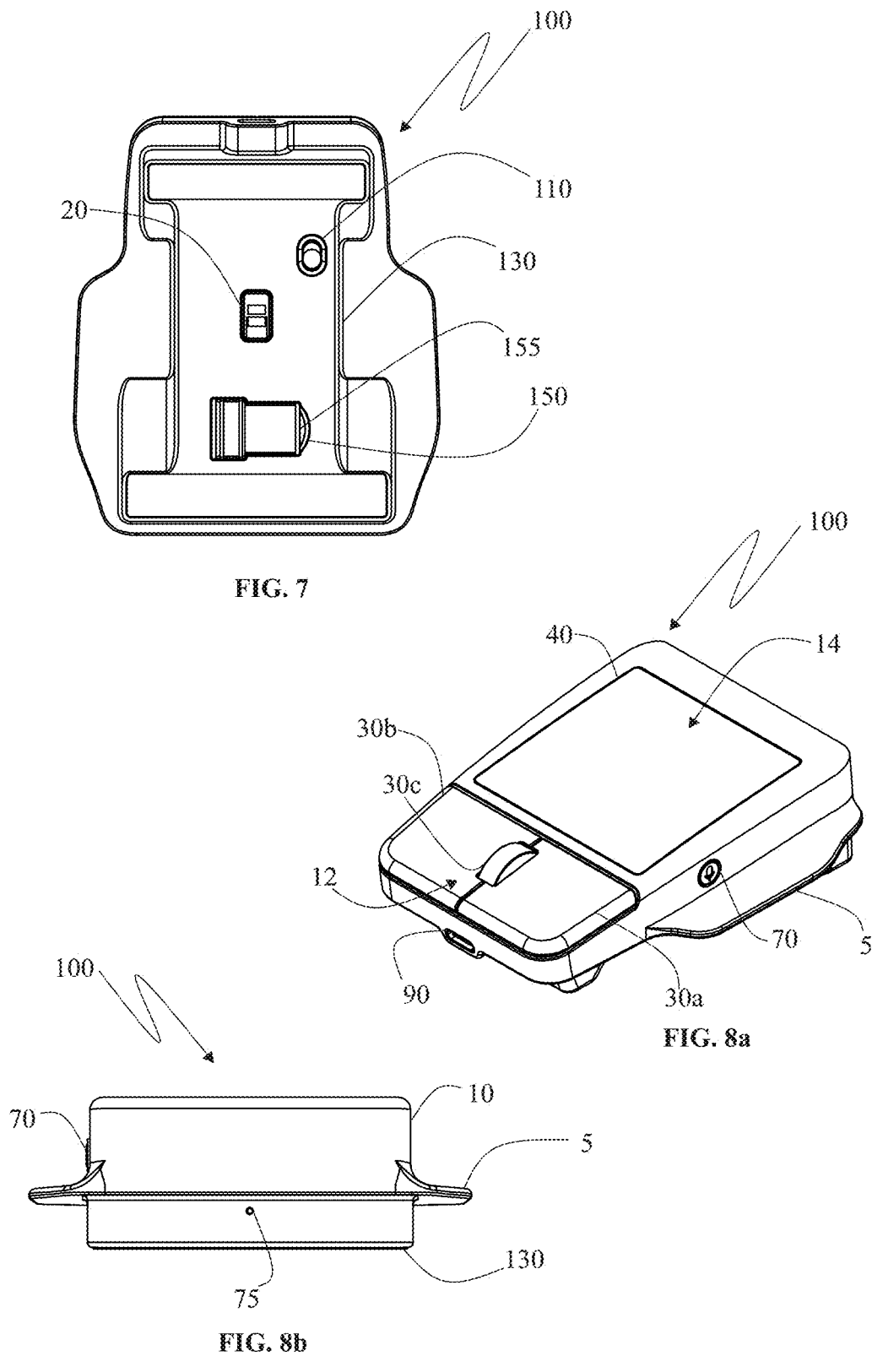

Referring now to FIG. 7, in an embodiment of the present invention, the input device (100) includes a switch (110) to turn ON or OFF the input device (100). In the preferred embodiment, the switch (110) is arranged on the bottom surface of the housing (10). It may be obvious for a person skilled in the art to arrange the switch (100) on any other portion of the input device (100). In the present embodiment, the switch (110) is a slide switch. It may be obvious for a person skilled in the art to configure the switch (110) as a push-button switch, toggle switch, rocker switch, touch-sensitive switch, capacitive switch, membrane switch, rotary switch, reed switch, proximity switch, optical switch, micro switch, lever switch, soft-touch switch, magnetic switch.

Referring again to FIG. 7, in an embodiment of the present invention, the input device (100) includes a USB connectivity unit (150). In this embodiment, the USB connectivity unit (150) is attachable to the input device (100) to store safely when not in use. Specifically, the input device (100) includes a recessed portion (155) to receive the USB connectivity unit (150) therein when the input device (100) is not in use. The USB connectivity unit (150) is detachable from the recessed portion (155) and is adapted to connect with the electronic device (200) to transmit the user input to the electronic device (200) wirelessly. In the preferred way, the USB connectivity unit (150) is a Bluetooth unit adapted to connect with the electronic device (200) and establish a communication between the input device (100) and the electronic device (200). It may be obvious for a person skilled in the art to configure the USB connectivity unit (150) with any other technology replacing the Bluetooth unit of the preferred embodiment.

Referring now to FIG. 8*a*, the input device (100) includes a charging port (90) to charge a battery stored in the housing (10). The battery allows the input device (100) to communicate with the electronic device (200) wirelessly. The charging port (90) is arranged on the side surface of the housing (10), especially on a front side surface of the housing (10). In an alternative embodiment, the charging port (90) is arranged on any other side of the housing (10).

Further, the input device (100) includes a voice-to-type button (70) (shown in FIG. 8*a*) arranged on the side surface of the housing (10) to receive voice input from the user. The processing unit (60) processes the voice input and generates the corresponding user input to communicate with the electronic device (200). Specifically, the voice-to-type button (70) turns on a microphone (75) when triggered to receive voice input from the user. In the present embodiment, the microphone (75) is provided on the rear portion (14) of the input device (100) (as shown in FIG. 8*b*). It may be obvious for a person skilled in the art to configure the microphone (75) on any other portion of the input device (100).

Figure 9:
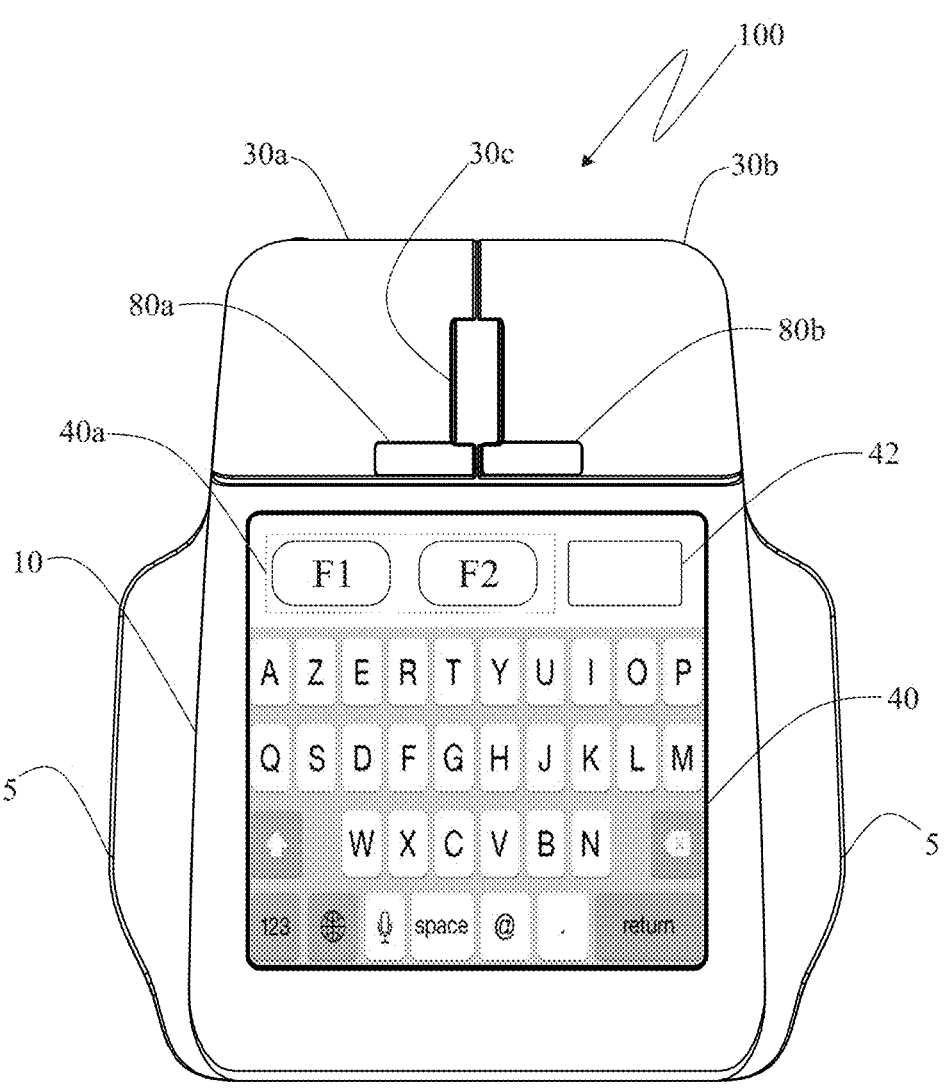
FIG. 9 shows a top view of an input device for interfacing with an electronic device in accordance with one of the embodiments of the present invention.

Referring now to FIG. 9, in an embodiment, the input device (100) further includes a fingerprint sensor (42) embedded within the touch display (40) to authenticate the user to use the input device (100) or the electronic device (200). In this embodiment, the fingerprint sensor (40) is an optical fingerprint sensor configurable within the touch display (40) to detect and scan fingerprints through the touch display (40). It may be obvious for a person skilled in the art to use any other type of fingerprint sensor (42) and arrange on any other surface of the housing (10) of the input device (100) to detect and scan the fingerprint to authenticate the user.

Referring again to FIG. 9, the input device (100) includes a first shortcut button (80*a*) and a second shortcut button (80*b*) arranged on the front portion (12). Specifically, in this embodiment, the first shortcut button (80*a*) and the second shortcut button (80*b*) are arranged on the first button (30*a*) and the second button (30*b*) of the plurality of buttons (30*a*, 30*b*, 30*c*) respectively. The first shortcut button (80*a*) and the second shortcut button (80*b*) are connected to the processing unit (60) and adapted to be customised according to the user. The user may configure the first shortcut button (80*a*) and the second shortcut button (80*b*) to perform preset tasks assigned by the user.

By way of a non-limiting example, the user may configure the first shortcut button (80*a*) via software settings on the electronic device (200) to open a browsing application when actuated. When the user presses the first shortcut button (80*a*), a signal of the user input is sent to the processing unit (60). The processing unit (60) processes the signal and communicates with the electronic device (200) to open the browsing application. Similarly, the second shortcut button (80*b*) is adapted to be customised according to the user's requirements. In another use case, the first shortcut button (80*a*) and the second shortcut button (80*b*) are configured to be used in combinations to perform actions. For example, pressing the first shortcut button (80*a*) and the first button (30*a*) of the plurality buttons (30*a*, 30*b*, 30*c*) simultaneously is used to perform the specified actions.

Figure 10A:
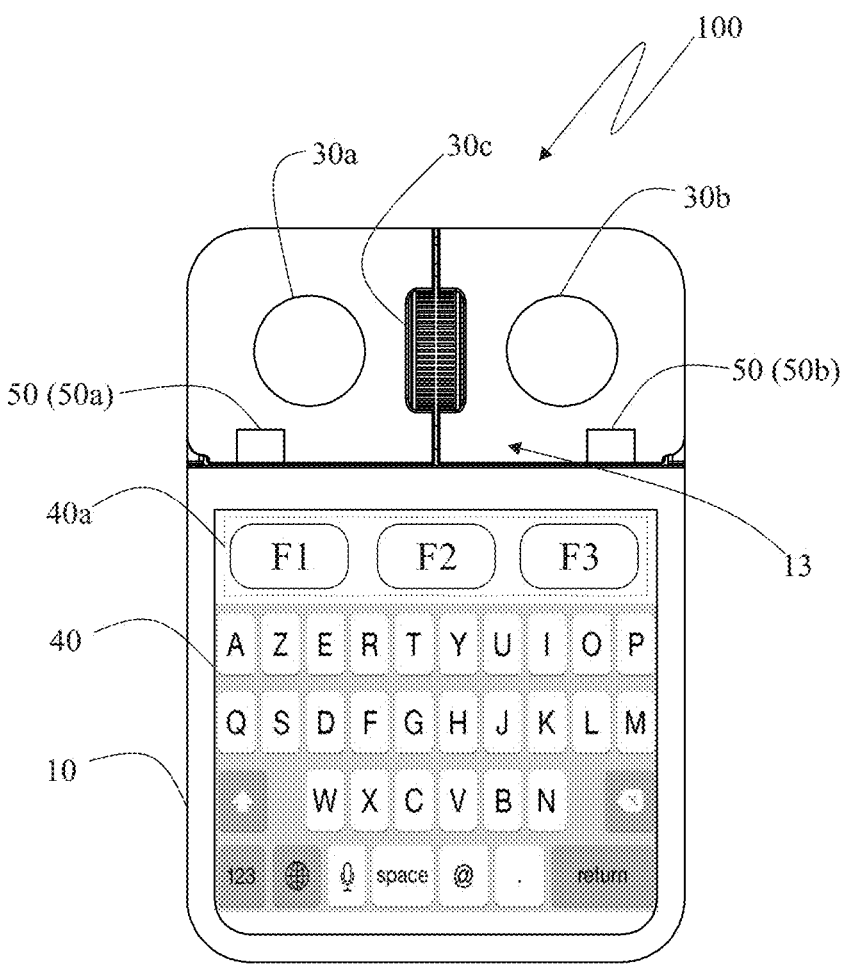
FIGS. 10a-10b show a top view and a side view of an input device for interfacing with an electronic device in accordance with one of the alternative embodiments of the present invention.
Figure 10B:
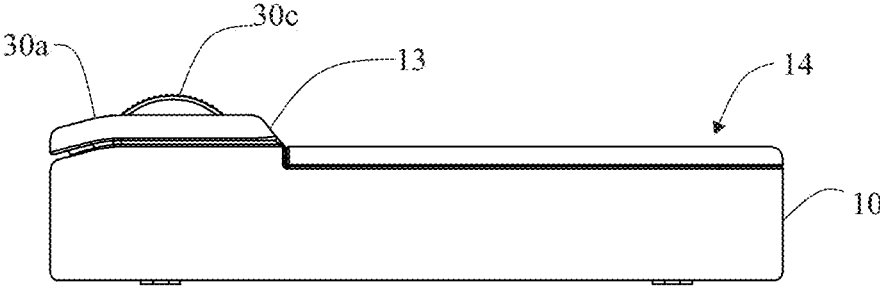

Referring now to FIGS. 10*a*-10*b*, in another embodiment, the input device (100) includes a slanted portion (13) arranged between the front portion (12) and the rear portion (14) separating the plurality of buttons (30*a*, 30*b*, 30*c*) and the touch display (40). The front portion (12) has a height more than a height of the rear portion (14). The slanted portion (13) extends from the front portion (12) in a down-ward direction to blend with the rear portion (14) of the top surface forming a step-like structure. The slanted portion (13) includes at least one sensor (50) and is adapted to detect the position of one or more fingers of the user relative to the touch display (40). In this embodiment, the sensor (50) is an infrared (IR) sensor to detect the position of one or more fingers of the user.

In another embodiment, the sensor (50) is a camera arranged on the housing (10) especially on the slanted portion (13) to detect the position of one or more fingers of the user. Preferably, the camera is arranged on the slanted portion (13). In the preferred use, the camera is equipped with a convex lens to detect the position of one or more fingers precisely. It may be obvious for a person skilled in the art to use a concave lens replacing the convex lens. In an alternate aspect, the camera can be arranged on any other portion of the housing (10) to detect one or more fingers of the user.

In the present embodiment, two sensors, a first sensor (50*a*) and a second sensor (50*b*) are arranged on the slanted portion (13) facing over the touch display (40) to detect the movement of one or more fingers of the user relative to the touch display (40).

Therefore, the advantage of the present invention is to provide an input device (100) for interfacing with the electronic device (200). The input device (100) is adapted to perform various tasks, including cursor (211) navigation, typing, gesture control, and multi-finger operations. The input device (100) combines tactile, touch, and motion-based inputs, to deliver a responsive and versatile user experience, making the input device (100) suitable for applications such as productivity, creative workflows, and more. The design of the input device (100) ensures that all input mechanisms are conveniently accessible, further enhancing usability and user comfort.

The foregoing descriptions of specific embodiments of the present invention have been presented for purposes of illustration and description. They are not intended to be exhaustive or to limit the present invention to the precise forms disclosed, and obviously, many modifications and variations are possible in light of the above teaching. The embodiments were chosen and described in order to explain the principles of the present invention best and its practical application, thereby enabling others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the claims of the present invention.

The invention claimed is:

1. An input device for interfacing with an electronic device, the input device comprising:
   a housing adapted to be held by a user, the housing has a top surface and a bottom surface, the bottom surface is adapted to slide over a fixed surface;
   a motion sensor adapted to detect movement of the input device relative to a fixed surface;
   a plurality of buttons arranged on the housing and adapted to transmit user input to the electronic device;
   a touch display arranged on a portion of the housing, configured to display a keyboard and receive touch input from the user;
   at least one sensor arranged on the housing, adapted to detect a position of one or more fingers of the user relative to the touch display for showing the position of the fingers on a screen of the electronic device;
   a processing unit configured to determine the position of the finger aligning with a key displayed on the touch display using the at least one sensor, and upon detecting the touch input corresponding to the position of the key, transmit an input signal of the selected key to the electronic device,
   wherein, the top surface includes a slanted portion configured between the front portion and the rear portion to arrange the at least one sensor thereon in such a way that the fingers of the user hovering over the touch display are detected to communicate with the processing unit of the input device.

2. The input device as claimed in claim 1, wherein the electronic device includes a virtual keyboard displayed on the screen of the electronic device to allow the user to track the finger for aligning above one or more keys of the keyboard, wherein the virtual keyboard is configured to receive the input signal from the touch display upon detecting the touch input from the user.

3. The input device as claimed in claim 1, wherein the sensor is a camera arranged on the housing to detect the position of the one or more fingers of the user.

4. The input device as claimed in claim 1, wherein the sensor is a capacitive touch sensor integrated within the touch display, calibrated to detect the position or movement of the fingers of the user hovering over the touch display.

5. The input device as claimed in claim 1, wherein the sensor includes a first sensor and a second sensor arranged adjacent to each other to detect at least one finger of the user.

6. The input device as claimed in claim 1, wherein the plurality of buttons includes a first button, a second button, and a scroll wheel arranged between the first button and the second button.

7. The input device as claimed in claim 1, wherein the touch display is arranged on an upper surface of the housing adjacent to the plurality of buttons, allowing the fingers of the user to reach the touch display.

8. The input device as claimed in claim 1, wherein the processing unit is adapted to transmit the input signal to the electronic device through a wire connection or a wireless connection.

9. An input device for interfacing with an electronic device, the input device comprising:

a housing adapted to be held by a user, the housing has a top surface and a bottom surface, the bottom surface is adapted to slide over a fixed surface;

a plurality of buttons arranged at a front portion of the top surface of the housing, and adapted to transmit user input to the electronic device;

a touch display arranged adjacent to the plurality of buttons at a rear portion of the top surface of the housing, configured to display a keyboard and receive touch input from the user;

at least one sensor arranged on the housing, adapted to detect a position of one or more fingers of the user relative to the touch display;

a processing unit configured to determine the position of the finger aligning with a key displayed on the touch display using the at least one sensor, and upon detecting the touch input corresponding to the position of the key, transmit an input signal of the selected key to the electronic device;

wherein, the top surface includes a slanted portion configured between the front portion and the rear portion to arrange the at least one sensor thereon in such a way that the fingers of the user hovering over the touch display are detected to communicate with a processing unit of the input device.

10. The input device as claimed in claim 9, wherein the plurality of buttons includes;

a first button arranged in a left region of the front portion;

a second button arranged in a right region of the front portion;

a scroll wheel arranged between the first button and the second button, rotatable to transmit user input to the electronic device.

11. The input device as claimed in claim 9, wherein the slanted portion separates the front portion and the rear portion, the slanted portion extends from the front portion in a downward direction and blends with the rear portion of the top surface.

12. The input device as claimed in claim 9, wherein the input device is connected to the electronic device through a wired connection or a wireless connection.

13. The input device as claimed in claim 9, wherein the plurality of buttons, the sensor, the touch display and the processing unit are connected to a power source to power the input device.

14. The input device as claimed in claim 13, wherein the power source is a battery arranged in the housing and adapted to charge using a charging port arranged on the housing.

15. The input device as claimed in claim 9, wherein the input device includes a switch arranged on the bottom surface of the housing to turn ON or OFF the input device.

16. The input device as claimed in claim 9, wherein the input device includes a first shortcut button and a second shortcut button arranged on the front portion, adapted to be customised according to the user, wherein the first shortcut button and the second shortcut button are configurable to perform preset tasks assigned by the user.

17. The input device as claimed in claim 9, the input device includes a voice-to-type button arranged on the side surface of the housing to receive voice input from the user, wherein the processing unit processes the voice input and generates the corresponding user input to communicate with the electronic device.

\* \* \* \* \*